July 27, 1965
A. F. WILCOX
3,197,585
ENDLESS ROLLER CHAIN MOVEMENT DETERMINING APPARATUS
WITH SWITCH ACTUATING MEANS
Filed Aug. 31, 1962
4 Sheets-Sheet 1
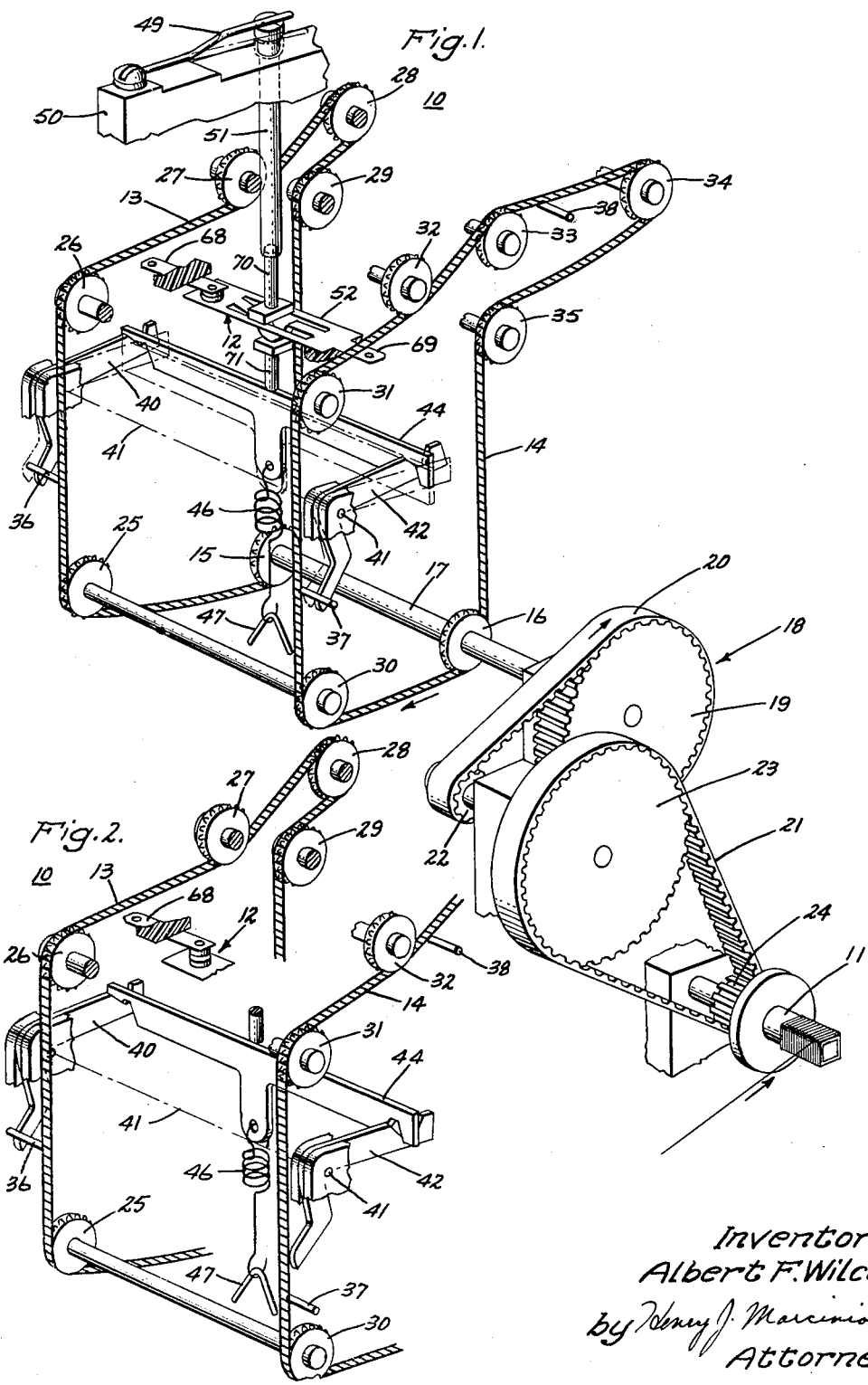
Inventor:
Albert F. Wilcox,
by Henry J. Marciniak
Attorney.

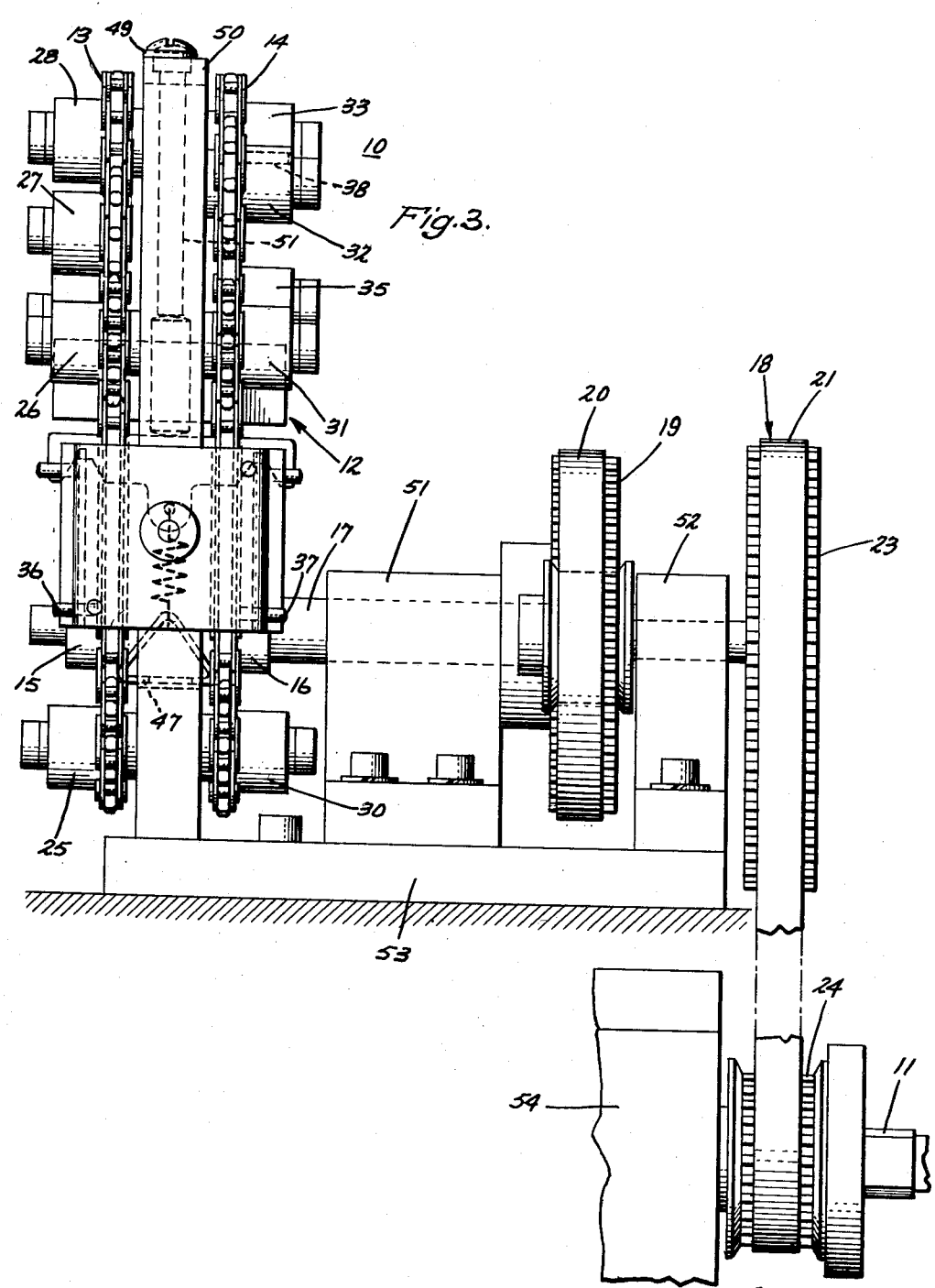

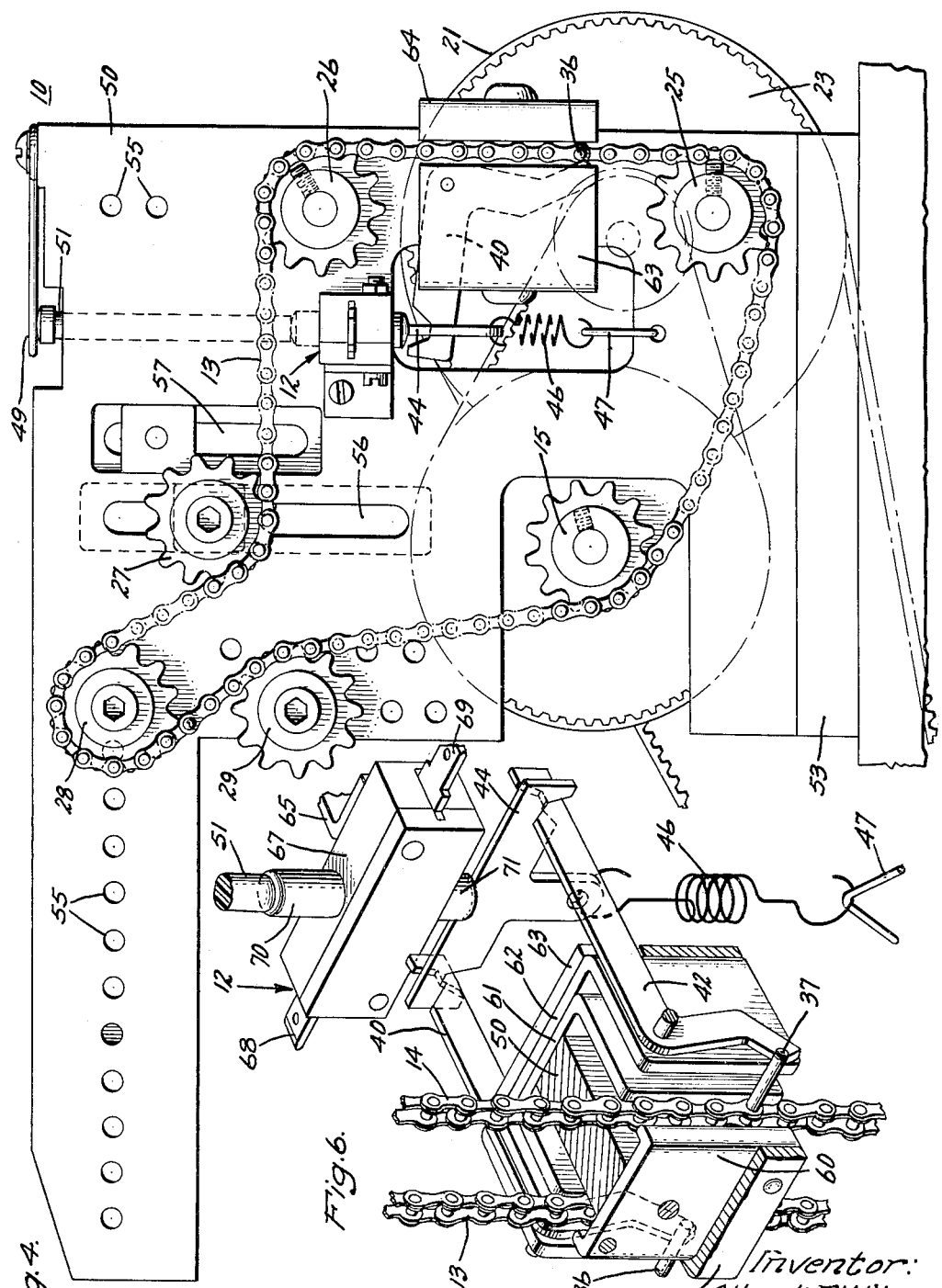

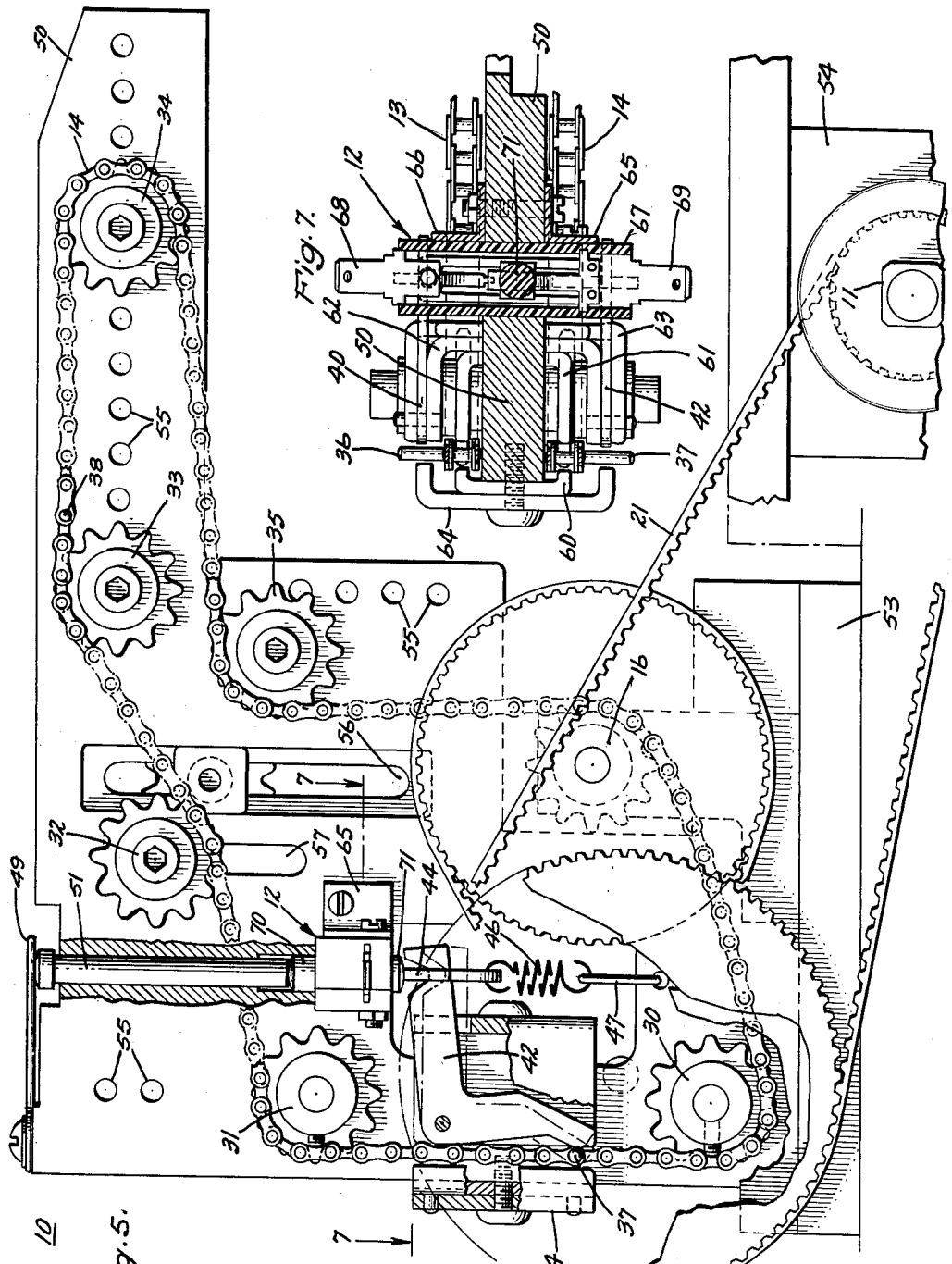

United States Patent Office 3,197,585
Patented July 27, 1965

3,197,585
ENDLESS ROLLER CHAIN MOVEMENT DETERMINING APPARATUS WITH SWITCH ACTUATING MEANS
Albert F. Wilcox, Yoder, Ind., assignor to General Electric Company, a corporation of New York
Filed Aug. 31, 1962, Ser. No. 220,785
8 Claims. (Cl. 200—61.13)

This invention relates to movement determining apparatus. More particularly, it relates to such apparatus for determining the rotational or translational movement of a member.

In many applications, it is desirable to automatically stop a movement after a predetermined distance has been traversed where the movement is translational, or after a predetermined number of turns where the movement is rotational. For example, in winding coils for small transformers it is necessary to stop the rotation of a coil arbor after a predetermined number of revolutions. In order to wind the primary and secondary windings of a commonly used dry type of transformer, a mechanical turn indicator is used to determine the turns wound on the coil as it rotates on an arbor. When a predetermined number of turns have been wound, the arbor is stopped.

Although such mechanical turn indicators are satisfactory at lower winding speeds, it was found that at higher winding speeds conventional mechanical counters do not provide an accurate turns count. Thus, there is a need for an apparatus that will determine movement accurately both at high and low speeds. It is also desirable that the apparatus be readily adaptable for actuating a switch or other means to stop the movement after a predetermined point has been reached.

Accordingly, it is a general object of my invention to provide an improved movement determining apparatus.

Another object of the invention is to provide an improved movement determining apparatus for counting the number of turns of a rotating member.

It is still another object of the invention to provide an improved movement determining apparatus that can readily actuate a switch or other means to stop the movement after a predetermined amount of the movement.

A further object of the invention is to provide a movement measuring apparatus that is capable of measuring rotational movement accurately at relatively high and low rotational speeds.

In the broader aspects of my invention, I have provided an improved apparatus for the determining movement of a movable member in which a first endless band having a predetermined number of unit lengths is employed in conjunction with one or more additional endless bands to determine the amount of movement of the member. The number of unit lengths in each of the endless bands is selected so that each number has no factor in common greater than one. The movement of the member is determined in multiples of the number of unit lengths in the first endless band.

The endless bands are movably supported, and a means is provided for advancing the endless bands proportionally in response to the movement to be determined by the apparatus. A position indicating means is provided on each of the endless bands for indicating the relative positions of the endless bands. The relative location of the position indicating means on the endless bands is used to determine movement. After a predetermined movement has been reached, the position indicating means may be used to actuate a switch to stop the movable member or to perform some other function.

According to another more specific form of my invention, I provide an improved apparatus for determining the movement of a rotating member. A first and a second endless roller chain are movably mounted and laterally spaced from each other and are comprised of links which are of substantially the same length, the second chain having a greater number of links. A suitable means is provided for driving the first and second endless roller chains so that a predetermined movement of the roller chains is proportional to a predetermined rotational movement of the member. For example, an advance of one link of the first and second endless roller chains may correspond to one or more revolutions or less than one revolution of the rotating member whose rotational movement is being determined.

A laterally projecting element is carried on the first endless roller chain and one or more laterally projecting elements may be carried on the second endless roller chain. The relative position of the laterally projecting elements determines when the rotating member has reached a predetermined number of revolutions. The second roller chain, in effect, counts the number of revolutions of the rotating member in multiples of the number of links in the first roller chain. If desired, the projecting elements may be used to actuate a switch to stop the rotational movement of the member after a predetermined number of revolutions have been reached or to perform other desired functions.

The subject matter which I regard as my invention is set forth in the appended claims. The invention itself, however, together with further objects and advantages thereof may be better understood by referring to the following description taken in conjunction with the accompanying drawings in which:

FIGURE 1 is a simplified schematic diagram in perspective of the one form of my invention employed to count the turns of a coil winding arbor;

FIGURE 2 is a schematic diagram of a portion of the apparatus shown schematically in FIGURE 1 and illustrating the condition of the apparatus when the switch contacts are in the open position;

FIGURE 3 is a front elevational view of the apparatus shown schematically in FIGURES 1 and 2;

FIGURE 4 is a side elevational view of the apparatus as seen from the left side of the view shown in FIGURE 3;

FIGURE 5 is a side elevational view of the apparatus as seen from the right side of the view shown in FIGURE 3;

FIGURE 6 is a diagrammatic perspective view of the switch actuating mechanism employed in the embodiment of the apparatus illustrated in FIGURES 3, 4 and 5; and FIGURE 7 is a sectional view taken on th line a—a of FIGURE 6.

In the illustrated exemplification of the invention, the improved motion determining apparatus 10 of my invention, as shown in FIGURE 1, is applied to determine the rotational movement of a coil winding arbor 11. A switch 12 is actuated when the coil winding arbor 11 has turned a predetermined number of revolutions. Although in the illustrated exemplification the invention is embodied in an apparatus 10 for determining turns or revolutions, it will be appreciated, however, that the invention may be used in applications where translational movement is to be determined.

Referring now more specifically to the schematic diagrams of the motion determining apparatus shown in FIGURES 1 and 2, it will be seen that a pair of endless bands or roller chains 13, 14 are movably supported in a laterally spaced relationship. The roller chains 13, 14 are driven at the same speed by drive sprockets 15, 16 keyed to a drive shaft 17. The shaft 17 is driven through a speed reducing means 18, which includes a pulley 19 keyed to the drive shaft 17, belts 20, 21, pulleys 22, 23 and a pulley 24 driven by the coil winding arbor 11. In the exemplification of the invention to be hereinafter more fully described, the speed reducing means 18 provided a reduction in speed of 12 to 1, so that for each revolution of the arbor 11 the roller chains 13, 14 advanced one unit length or one link, the drive sprockets 15, 16 each having 12 teeth.

As will be seen in FIGURE 1, the endless roller chain 13 is guided by the sprockets 15, 25, 26, 27, 28 and 29. Endless roller chain 14, which has a greater length than roller chain 13, is guided by sprockets 16, 30, 31, 32, 33, 34 and 35. It will be seen that endless roller chain 13 is provided with a position indicating means, a laterally projecting pin 36. Endless roller chain 14 carries a pair of laterally projecting pins 37, 38.

As roller chain 13 is driven, it will be seen that the pin 36 passes over and displaces the arm of a bell crank 40 which pivots about an axis 41. Similarly, as the pins 37, 38 carried on roller chain 14 pass over the arm of a bell crank 42, it is displaced and pivots about the axis 41. When the relative location of the pin 36 and one of the pins 37, 38 is such that the pair of pins passes over the arms of the bell cranks 40, 42 at the same instant, the displacement imparted by the bell cranks 40, 42 to a rocking beam 44 is sufficient to bring the contacts of the switch 12 together and thereby close the switch 12. When this condition occurs, a predetermined number of turns of the arbor 11 have been reached. The switch 12 may be connected in electrical circuit with a relay to stop the rotation of the arbor 11 or may perform any other desired function at the point when the predetermined number of turns have been attained.

As will be hereinafter more fully explained, the number of links in roller chain 13 provides a basis for counting the revolutions of the coil winding arbor 11. The longer roller chain 14, in effect, counts the revolutions in multiples of the number of links in the shorter roller chain 13. Additional intermediate counts in multiples of the number of links in the endless roller chain 13 may be obtained by placing additional pins at the proper locations on roller chain 14.

The manner in which the switch 12 is actuated will now be more fully described. It will be seen that the rocking beam 44 is supported by the bell cranks 40, 42 and is displaced whenever one of the bell cranks 40, 42 is pivotally moved by the pins 36, 37, 38. A spring 46 attached to a hook 47 and the rocking beam 44 applies a spring force to the bell cranks 40, 42 so that the arms of the bell cranks 40, 42 extend in the path of the pins carried by the roller chains 13, 14. As long as only one of the pins 36, 37 or 38 at any given instant depresses one of the bell cranks 40, 42, the rocking beam 44 does not rise sufficiently in a vertical direction to close the contacts of the switch 12. It is only when both of the bell cranks 40, 42 are simultaneously displaced by a pin on each of the endless roller chains 13, 14 that the rocking beam 44 is lifted a distance sufficient to close the contacts as shown in FIGURE 1.

In FIGURE 2, I have shown the position of the bell cranks 40, 42 for a condition when only the projecting pin 36 on roller chain 13 engages the arm of bell crank 40. Although the rocking beam 44 is displaced by the pivotal movement of the bell crank 40, this displacement is insufficient to close the switch 12. As will be seen in FIGURE 1, switch 12 is normally maintained in the open position by a cantilever spring 49 attached to frame member 50. The spring 49 exerts a spring force against a dowel 51, which is movably supported in the frame member 50 and engages the upper push button 70 attached to a contact plate 52 of switch 12. Thus, switch 12 is usually in an open position and is not closed until both of the bell cranks 40, 42 are pivotally displaced at the same instant.

In FIGURE 3, I have illustrated a front elevational view of the movement determining apparatus 10 shown schematically in FIGURES 1 and 2. In this detailed view and in the other figures of my drawing, I have used the same reference numerals to show the correspondence between the detailed drawings shown in FIGURES 3, 4, 5, 6 and 7 and the schematic representation thereof in FIGURES 1 and 2.

Referring more particularly to the front elevation shown in FIGURE 3, the roller chains 13, 14 and their associated sprockets are shown mounted on the vertical frame member 50. Vertical frame member 50 and bearing supports 51, 52 are rigidly attached to a base member 53 which may be attached to the coil winding machine or other machine with which the motion determining apparatus 10 is associated. The coil winding arbor 11 is rotatably supported by a support frame 54.

In the illustrative exemplification of my invention, a timing belt and pulley system was used as a speed reducing means. However, it will be appreciated that other speed reducing systems may be employed to provide the speed reduction necessary to cause the roller chains 13, 14 to advance one link or other selected unit length for one revolution or other rotational movement of the coil arbor 11.

Having more specific reference now to the side elevational views shown in FIGURES 4 and 5, it will be noted that the location of sprockets 26, 27, 28, 29, 31, 32, 33, 34 and 35 on the frame member 50 can be adjusted to permit roller chains of varying lengths to be employed. The holes 55 are provided to permit the location of sprockets 26, 27, 28, 29, 31, 33, 34 and 35 to be changed as required. Sprockets 27 and 32 are adjustably supported in slots 56, 57 so that tension on the roller chains 13, 14 can be readily adjusted. It will be appreciated that for a given number of links in roller chain 13, the apparatus 10 is capable of counting turns in multiples of this given number.

In the side elevational views of the apparatus 10, I have shown the pins 36 and 37 in engagement with the bell cranks 40, 42. In this condition of the apparatus 10, the rocking beam 44 is in the extreme vertical position, and the switch 12 is in the closed position. The pins 36, 37 when they are in the position shown in FIGURES 4 and 5 cause a pivotal displacement of the bell cranks 40, 42 and an extension of the spring 46. Also, the dowel 51 is pushed upwardly against the cantilever spring 49.

The details of the switch actuating mechanism are more fully shown in the perspective view of FIGURE 6 and the sectional view of FIGURE 7. Guide channels for the roller chains 13, 14 are provided by a pair of channel shaped members 60, 61, which are rigidly attached to the frame member 50. An additional pair of channel shaped members 62, 63 support the bell cranks 40, 42, member 63 providing a stop for the pivotal movement of the bell cranks 40, 42. A channel shaped member 64 in conjunction with members 62, 63 serves as a guide for the pins 36, 37, 38 as they pass through the pin channel formed by the members 62, 63, 64. When the pins 36, 37, 38 do not engage the arm of the bell cranks 40, 42, the bell cranks 40, 42 extend into the pin channels formed by the members 62, 63, 64 so that the pins 36, 37, 38 strike the bell cranks 40, 42 each time that they pass through the pin channels.

As will be seen in the sectional view of FIGURE 7, the switch 12 is rigidly attached to the vertical frame member 50 by the angle pieces 65, 66. The switch 12 is enclosed in a housing 67 and is provided with the terminals 68, 69 adapted for connection to an electrical circuit. As applied to a coil winding machine, the switch 12 was used to operate a solenoid (not shown) which stopped the coil winding arbor 11 when a predetermined number of turns had been reached. As is shown in FIGURES 5 and 6, the switch 12 has an upper and lower push button 70, 71. The switch 12 is actuated to its closed position by moving the lower push button 71 inwardly and to its open position by the action exerted by the cantilever spring 49 against the dowel 51 and the upper button 70.

Having particular reference to the schematic diagram of FIGURE 1, I will now more fully describe the operation of the movement determining apparatus 10 as applied to a coil winding operation. Let us assume that it is desired to wind a coil on the arbor 11. For example, the coil is to be wound with one winding having 3534 turns and another winding having 171 turns. The numbers of links required in the roller chains 13, 14 will consist of two factors which when multiplied by each other will provide the total number of turns (3705 turns). The two factors selected should not contain a common factor other than the numeral one (1). If we take the prime factor 57, this is divisible into 3705 by the factor 65.

In accordance with the invention, we shall employ a roller chain 13 having 57 links and a roller chain 14 with 65 links. As was previously mentioned, a link of the roller chains 13, 14 was used as a unit length to determine the rotational movement of the arbor 11 since the speed reducing means 18 was designed to advance the roller chains 13, 14 one link for each revolution of the coil winding arbor 11. The pins 36, 37 shall be placed in the location as shown in FIGURE 1, both pins 36, 37 being aligned so that the bell cranks 40, 42 are displaced. In order to stop the arbor 11 at 171 turns or revolutions of the coil arbor, a second pin 38 was mounted on roller chain 14. The second pin 38 on roller chain 14 should be located 24 links away from the first pin 37 as measured in a clockwise direction as seen in the view of FIGURE 1, or 41 links as measured in a counterclockwise direction. With the pins 37, 38 in this position, the movement determining apparatus 10 will first actuate the switch 12 when the arbor 11 revolves through 171 revolutions and will again actuate the switch 12 when the arbor 11 revolves through an additional 3534 revolutions, assuming that roller chain 13 has 57 links and roller chain 14 has 65 links.

The apparatus 10 is started with the pins 36, 37 aligned as shown. After the coil arbor 11 completes 57 revolutions or when roller chain 13 has completed one revolution, pin 37 on roller chain 14 having 65 links will be 8 links away from the starting position while the other pin 38 will be 16 links away as measured in a counterclockwise direction. After 114 revolutions of the coil arbor 11 or two complete revolutions of the roller chain 13, pin 37 will be 16 links from the starting position as measured in counterclockwise direction, and pin 38 will be 8 links away from the starting position as measured in a clockwise direction. After 171 revolutions of the coil arbor 11 or three complete revolutions of roller chain 13, pin 37 on roller chain 14 will be 24 links away from the starting position as measured in a counterclockwise direction. Pin 38 will be exactly at the starting position and aligned with pin 36. Since both pins now displace the bell cranks 40, 42, the rocking beam 44 has sufficient vertical lift to cause switch 12 to close. In this manner, the first count of 171 turns is determined, and the rotation of the coil winding arbor 11 is stopped by the action of switch 12.

The start of the second winding is now placed on the coil arbor 11, and the coil arbor is again started. The pin 37 on roller chain 14 does not fall in alignment with the pin 36 on roller chain 13 to simultaneously actuate both bell cranks 40, 42 until roller chain 13 has traversed 62 revolutions or after the coil arbor 11 has completed 3534 turns. At this point, both bell cranks are displaced and the rocking beam 44 is lifted vertically to close switch 12, and the movement measuring apparatus 11 is now in position for starting of another counting cycle. It will be appreciated that the number of links for roller chains 13, 14 given in the foregoing illustrative example and in the illustrative example to be hereinafter described are not intended to correspond to the actual number of links illustrated in drawings of the roller chains 13, 14.

Where the total number of turns cannot be reduced to numbers without a common factor, an approximation may be used. By way of another example, let us consider a coil that requires 6300 turns. The number of links 70 and 90 are not satisfactory because the two numbers have, in addition to other common factors, a factor of ten. The numbers 91, 69 do not have any common factors other than one but would determine 6279 turns, or 21 turns less than the desired 6300 turns. The numbers 93, 67 also do not have a common factor but would provide a count of 6230 turns. However, it will be noted that 67 turns can be added to this count by using 94 links in roller chain 14 instead of 93. Thus, if 94 links are used in roller chain 14, and 67 links are used in roller chain 13, the pins 36, 37 will be in alignment to close switch 12 when the arbor 11 reaches 6298 turns. This approximation is reasonably close and if desired, the two turns can be readily added by manually finishing the coil.

Although in the illustrated embodiment of the invention, the links of a roller chain were used to determine rotational movement, it will be appreciated that the advance of the links can readily be made proportional to translational movement and further, although endless roller chains were used in the illustrated embodiments of the invention, it will be apparent that other endless band arrangements may be used. Also, it will be apparent that more than two endless bands may be used to carry out the movement measuring function in accordance with the improved arrangement of my invention. For example, if a third endless band is used, the number of unit lengths of this band can be greater or less than the first two and this number should include no factor other than one in common with the number of unit lengths of the two other endless bands.

An important advantage of the invention is the adaptability of the movement measuring apparatus to automated and semi-automated type of production machines. Movement of a translating or rotating member can be accurately determined with two major moving parts. These moving parts are relatively short lengths of a roller chain having a predetermined number of links in each chain. Further, the movement determining apparatus of the invention can be readily adapted to perform a control function when a predetermined movement has been reached.

From the foregoing description and discussion of the invention, it will be apparent to those skilled in the art that many modifications may be made. It is intended, therefore, by the appended claims to cover all such modifications that fall within the true spirit and scope of my invention.

What I claim as new and desire to secure by Letters Patent of the United States is:

1. An apparatus for determining movement of a moving member, said apparatus comprising: a moving member, a first endless band having a predetermined number of unit lengths, a second endless band having a number of unit lengths greater than said predetermined number of unit lengths in said first endless band, the number of unit lengths in said first endless band having no factor greater than one in common with the number of unit lengths in said second endless band, means for movably supporting said endless bands, means for advancing said endless bands proportionally in response to the movement of the moving member, means on said first endless band for indicating a position on said first endless band, and means on said second endless band for indicating a position on said second endless band, said means on said endless bands having an initial relative location and when said endless bands are advanced to displace said means on said first and second endless bands to a preselected relative location, said preselected relative location of said means on said first and second endless bands determining the extent of said movement of the moving member, and said extent of movement being determined in multiples of the number of unit lengths of said first endless band.

2. An apparatus for determining rotational movement of a rotating member, said apparatus comprising: a rotating member, a first endless roller chain, a second endless roller chain, said first and second roller chains being comprised of links having substantially the same length, support means for movably mounting said first and second roller chains in a laterally spaced relationship, and means for driving said first and second endless roller chains proportionally in response to the rotational movement of the member, each of said endless roller chains having at least one laterally projecting element mounted thereon, said laterally projecting elements having an initial relative position, and when said laterally projecting elements are moved to at least one preselected relative position, said preselected relative position of said laterally projecting elements determining the rotational movement of the member, said rotational movement being determined as a multiple of the number of links in said first endless roller chain, and the number of links in said first roller chain and the number of links in said second endless chain having no factor in common greater than one.

3. An apparatus for determining movement of a moving member, said apparatus comprising: a moving member, a first endless band having a predetermined number of unit lengths, at least one additional endless band having a number of unit lengths greater than said predetermined number of unit lengths in said first endless band, the number of unit lengths in said first endless band having no factor greater than one in common with the number of unit lengths in said second endless band, means for movably supporting said endless bands in laterally spaced relation, means for advancing said endless bands proportionally to the movement of the moving member, and a position indicating means on said first endless band and a position indicating means on said additional endless band, said position indicating means on said first and said at least one additional endless band having an initial relative position, and when said position indicating means on said endless bands are moved to at least one preselected relative location, said preselected relative location of said position indicating means of said first endless band and said additional band determining a predetermined movement of the member, said preselected movement being determined in multiples of the number of unit lengths of said first endless band.

4. An apparatus for determining the rotational movement of a member, said apparatus comprising: a movable member, a first endless roller chain having a predetermined number of links, a second endless roller chain having a number of links greater than said predetermined number of links in said first endless roller chain, the number of links in said first endless roller chain having no factor greater than one in common with the number of links in said second endless roller chain, means for movably mounting said first and second endless roller chains, means for driving said first and second endless roller chains proportionally to the rotational movement of the member, a first position indicating means mounted on said first endless roller chain, and a second position indicating means mounted on said second endless roller chain, said first and second position indicating means having an initial relative location, and when said first and second position indicating means are moved to return to at least said initial relative location, relative location of said position indicating means indicating a predetermined rotational movement of the member, and said predetermined rotational movement being determined as a multiple of the number of links in said first endless roller chain.

5. An apparatus for determining the rotational movement of a rotating member, said apparatus comprising: a rotating member, a first endless roller chain having a predetermined number of links, a second endless roller chain having a number of links greater than said predetermined number of links of said first endless roller chain, the links of said first and second endless roller chains being substantially the same in length, the number of links in said first endless roller chain having no factor greater than one in common with the number of links in said second endless roller chain, means for movably supporting said first and second endless roller chains, means for moving said chains proportionally to the movement of said rotating member, a switching means for stopping the rotation of said rotating member, a first position indicating means carried on said first endless roller chain, and a second position indicating means carried on said second endless roller chain, said first and second position indicating means having an initial relative location at which said first and second position indicating means are aligned and when said first and second endless roller chains are moved from said initial relative location and restored again to said initial relative location, the restored relative location indicating a predetermined rotational movement of the member and causing said switching means to be actuated, and said predetermined rotational movement determined as a multiple of the number of lengths in said first endless roller chain.

6. An apparatus for determining the rotational movement of a rotating member, said apparatus comprising: a rotating member, a first endless roller chain having a predetermined number of links, a second endless roller chain having a number of links greater than said predetermined number of links in said first endless roller chain, the number of links in said first endless roller chain having no factor greater than one in common with the number of links in said second endless roller chain, means for movably mounting said first and second endless roller chains in laterally spaced relationship, means for advancing said endless roller chains proportionally in response to the movement of the rotating member, a laterally projecting pin carried on said first endless roller chain, and at least one laterally projecting pin carried on said second endless roller chain, said laterally projecting pins having an initial relative location, and when said laterally extending ends are advanced and restored to said initial relative location, the restored initial relative location indicating a predetermined rotational movement of the rotating member, said rotational movement being determined as a multiple of the number of links in said first endless roller chain.

7. An apparatus for determining movement of a moving member, said apparatus comprising: a moving member, a first endless band having a predetermined number of unit lengths, at least one additional endless band having a number of unit lengths greater than said predetermined number of unit lengths in said first endless band, the number of unit lengths in said first endless band having no factor greater than one in common with the number of unit lengths in said second endless band, means for movably supporting said endless bands in laterally spaced relation, means for advancing said endless bands proportionally in response to the movement of the moving member, a laterally projecting pin carried on said first endless band, a laterally projecting pin carried on said additional endless band, said laterally projecting pins being aligned at an initial relative location, a switching means, and a means for actuating said switching means when said laterally projecting pins on said first endless band and said additional band are advanced and again laterally aligned and restored to said initial relative location, said restored initial relative location indicating a predetermined movement of the member, said predetermined movement being determined in multiples of the number of unit lengths of said first endless band.

8. An apparatus for determining movement of a moving member, said apparatus comprising: a moving member, a first endless band having a predetermined number of unit lengths, at least one additional endless band having a number of unit lengths greater than said predetermined number of unit lengths in said first endless band, the number of unit lengths in said first endless band having no factor greater than one in common with the number of unit lengths in said second endless band, means for movably supporting said endless bands in laterally spaced relation, means for advancing said endless bands proportionally in response to the movement of said moving member, a laterally projecting pin carried on said first endless band, said laterally projecting pins being aligned at an initial relative location, a laterally projecting pin carried on said additional endless band, a switching means, and means for actuating said switching means when said laterally projecting pins on said first endless band and on said additional band are advanced and again laterally aligned and restored to said initial relative location, said restored initial relative location indicating a predetermined movement of the moving member, said means for actuating said switching means including a pair of pivotally supported bell cranks and a rocking beam supported by said bell cranks, said rocking beam actuating said switching means when said bell cranks are displaced by said laterally projecting pins carried by said first endless band and said additional endless band, and said predetermined movement of the movable member being determined in multiples of the number of unit lengths of said first endless band.

References Cited by the Examiner

UNITED STATES PATENTS

| | | | |
|---|---|---|---|
| 704,108 | 7/02 | Rice | 200—33 |
| 2,244,299 | 6/41 | Johnston et al. | 200—46 |
| 2,256,117 | 9/41 | Keeley | 200—33 |
| 2,356,167 | 8/44 | McKelvey | 74—640 |
| 2,709,220 | 5/55 | Spector | 191—12 |
| 2,927,979 | 3/60 | Chuchla | 200—33 |

BERNARD A. GILHEANY, *Primary Examiner.*

ROBERT K. SCHAEFER, *Examiner.*